United States Patent [19]

Masot

[11] Patent Number: 4,737,769

[45] Date of Patent: Apr. 12, 1988

[54] FIRE DETECTION ALARM SYSTEM

[76] Inventor: Oscar Vila-Masot, Doral Beach, Complejo Turistico "El Morro", Puerto de la Cruz, Venezuela

[21] Appl. No.: 815,946

[22] Filed: Jan. 3, 1986

Related U.S. Application Data

[63] Continuation-in-part of Ser. No. 710,672, Mar. 12, 1985, Pat. No. 4,635,040.

[51] Int. Cl.[4] .......................... G08B 1/08; H04Q 7/00

[52] U.S. Cl. .................................... 340/533; 340/531; 340/538; 340/310 CP; 340/310 R

[58] Field of Search ......... 340/533, 531, 538, 310 CP, 340/310 R, 310 A, 577, 584, 588-590, 649, 650; 361/42

[56] References Cited

U.S. PATENT DOCUMENTS

| | | | |
|---|---|---|---|
| Re. 31,147 | 2/1983 | Helwig, Jr. et al. . | |
| 3,320,601 | 5/1967 | Yankus . | |
| 3,644,912 | 2/1972 | Allen, Jr. . | |
| 3,872,355 | 3/1975 | Klein et al. . | |
| 3,886,534 | 5/1975 | Rosen et al. | 340/538 |
| 3,925,763 | 12/1975 | Wadhwani et al. | 340/538 |
| 4,040,046 | 8/1977 | Long et al. | 340/310 CP |
| 4,058,678 | 11/1977 | Dunn et al. | 340/310 CP |
| 4,203,096 | 5/1980 | Farley et al. | 340/538 |
| 4,429,299 | 1/1984 | Kabat et al. | 340/538 |
| 4,446,454 | 5/1984 | Pyle | 340/533 |
| 4,635,040 | 1/1987 | Masot | 340/533 |

*Primary Examiner*—Donnie L. Crosland
*Attorney, Agent, or Firm*—Hoffman, Wasson & Fallow

[57] ABSTRACT

An alarm system utilizing existing electrical wiring in conjunction with an alarm box. An alarm signal is manually or automatically generated and is converted to an RF signal which is conducted over the existing electrical wiring to an alarm box. The RF signal is re-converted to an electronic or electrical signal and the alarm signal is visually displayed. Various sensors for sensing the presence of various conditions, such as fire or unauthorized intrusion are removeably or directly affixed to plug receptacles or wall switches. Additionally, the system is connected to circuit protection devices, such as circuit breakers which could be tripped, should a fire conduction be sensed.

8 Claims, 5 Drawing Sheets

FIRE DETECTION ALARM SYSTEM

This application is a continuation-in-part of application Ser. No. 710,672, now U.S. Pat. No. 4,635,040, filed 3-12-85.

BACKGROUND OF THE INVENTION

Virtually no single event can cause as much destruction or engender a feeling of terror in an individual than can a fire. Many alarm systems have been developed and are currently on the market which provide both an alarm system for alerting the individuals present in a particular building or similar structure of the presence of a fire, and then communicating this information to the proper authorities, such as the fire department and the police department. However, these systems are often time prohibitively expensive to the average home owner or they do nothing to alleviate the potential damage which can be caused by the fire.

One potential danger which can occur, and can substantially increase the potential for physical harm to people and increase the damage to various structures, is for the fire to spread to the electrical wiring system which is provided within the structure. Although this system is, of course, important to providing energy to the many electrical appliances and other devices which are utilized, it can also be the cause of increased damage to the structure once a fire is burning. Therefore, it is important that a system which is inexpensive to opeate, which alerts an individual to the presence of a fire condition, and which prevents current from flowing through existing electrical wiring system if a fire condition is sensed, be developed.

The prior art is replete with various devices which employ the existing electrical wiring in buildings to both provide an alarm and to disable the electrical system when a fire is sensed. One such device is described in U.S. Pat. No. 3,872,355 issued to Klein et al. This patent shows a fire protection system used in connection with a ground fault circuit interrupter (GFCI). This patent employs a thermal sensor which is incorporated into an electrical outlet. This sensor senses the presence of a thermal condition above an appropriate temperature threshold and either activates the GFCI unit which interrupts the current in the circuit, or simply activates an alarm at the amain circuit breaker without interrupting the circuit. Although the patent to Klein et al utilizes the existing electrical circuitry in a building for interrupting the current flow in the wiring and additionally activating an alarm, various problems have been found to exist with this particular device.

U.S. Pat. No. Re. 31,147 issued to Helwig, Jr. et al discloses a ground fault and fire detector system which detects the presence of a ground fault current or a fire and opens a circuit breaker to disconnect the power lines from the electrical equipment to which they are connected. However, it should be noted that the particular fire sensor which is utilized is not directly provided in an electrical outlet or wall switch.

U.S. Pat. No. 3,644,912, issued to Allen, Jr. discloses a sensing unit that operates an alarm when it detects a current flow through the ground wire. It should be noted that this patent discusses a system in which a removable sensing means is provided and one which does not operate to interrupt current through the system.

U.S. Pat. No. 3,320,601 issued to Yankus discusses a fire sensing alarm in combination with electric power receptacles which indicate the presence of a fire by an energizing fire alerting alarm connected to a thermally sensitive bimetallic disc provided at the receptacle. As was true with respect to the patent to Allen, Jr., this patent does not interrupt the current flow in the electrical wiring system when a fire is detected.

SUMMARY OF THE INVENTION

The present invention ovrecomes the deficiencies of the prior art by providing a simple and inexpensive system for detecting a potential fire hazard within a dwelling, apartment building, office building or any other structure by utilizing the existing electrical terminals and wiring in the structure. Aural or visual alarms are connected to the existing electrical wiring and are directly activated when the potential hazard is sensed. Alternatively, the current flow in the system can be interrupted by tripping the circuit breaker provided in the systm and simultaneously activating the aural or visual alarms. These alarms are enabled either directly by the signals generated by the fire detecting sensors or by sensing the interruption of current flow in the system.

This invention employs sensors which are directly and permanently mounted within an electrical outlet or wall-mounted switch. These sensors sense the presence of a fire and interrupt current flowing in the electrical wiring by tripping the appropriate circuit breaker or fuse. Simultaneously, an aural and visual alarm is activated provided in the alarm system described in U.S. patent application Ser. No. 654,157, filed Sept. 24, 1984 in the name of the present inventor.

Alternatively, the present invention describes a system whereby the circuit breaker is activated by an encoded radio frequency (RF) signal. An electrical or electronic signal produced by the sensors is converted to an encoded RF signal which is transmitted along the existing AC power line provided in the existing electrical circuitry and is then re-converted back into an electrical or electronic signal which is used to activate one or more circuit breakers. Additionally, both the aural and visual alarms provided either at the circuit breaker panel box or at a remote location from the panel box are activated.

Furthermore, the present invention can be used to integrate security and emergency medical alert functions into the fire hazard safety system. A transmitter is provided in the protected area which automatically or manually produces a signal which is transmitted to a remote location through the existing A.C. power line. A signal is produced at this remote location indicating the presence of an emergency situation, such as a medical emergency or an unauthorized intruder is presently in the protected area. Dependent upon the particular emergency, the circuit breakers would or would not be tripped and the particular emergency is displayed upon a monitored screen a panel board indicating the location and the nature of the emergency. Obviously, this invention would then have particular application in office and apartment buildings whereby a guard is present for monitoring emergency situations.

The above and other objects, features and advantages of the present invention will become more apparent from the following description thereof taken in conjunction with the accompanying drawings.

DETAILED DESCRIPTION OF THE PRESENT INVENTION

Figure 1:
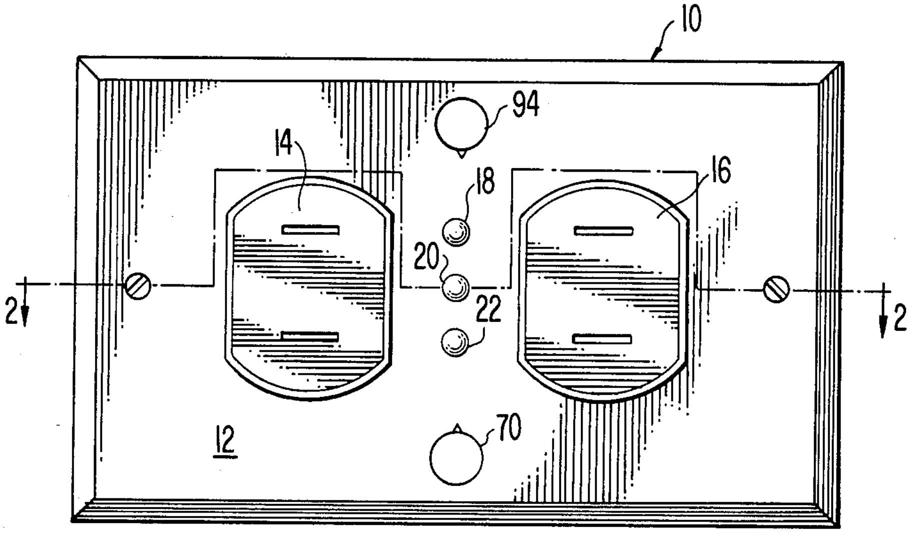
FIG. 1 is a front elevational view of the sensors of the present invention provided in a standard wall receptacle.
Figure 2:
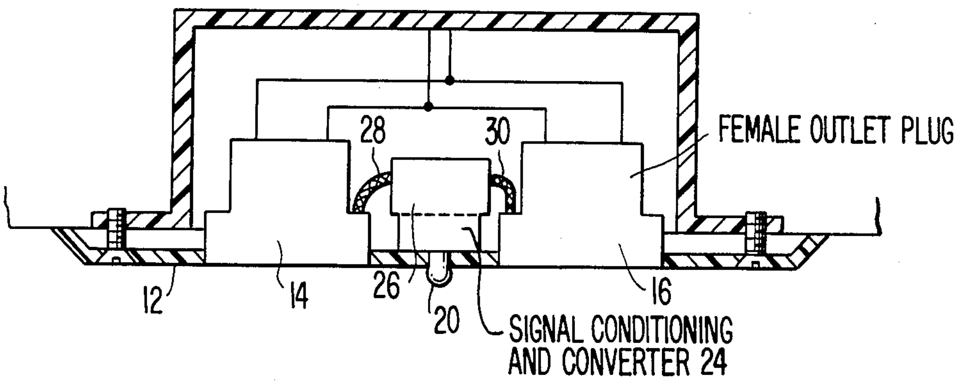
FIG. 2 is a sectional view taken through a plane indicated by the section line 2—2 in FIG. 1.

The present invention as described with respect to the drawings, is intended to be utilized with the existing wiring provided in a particular structure or dwelling. A plurality of wall-mounted receptacles 10 is electrically connected to contacts engaged by prongs inserted into female outlet plugs 14 and 16. Each receptacle 10 is provided with a planar surface 12 having apertures provided thereon adapted to correspond to the position of each of the female outlet plugs 14 and 16. Sensors 18, 20 and 22 are fixedly attahced to or are provided in holes on the planar surface 12 of the wall receptacle 10. These sensors detect the presence of a fire condition by sensing a sudden change in the level of tempeature, light or the presence of smoke in the area immediately adjacent to each receptacle. These light, temperature and smoke sensors are presently commercially available and need not be described further. Furthermore, it should be noted that additional types of sensors could be utilized for sensing a particular condition which is present during a fire.

Once one or more of the sensors determines that a fire condition is present, an electrical or electronic signal is produced which is conducted to a signal conditioning and converter apparatus 24. This apparatus 24 is utilized to properly condition the signal and to produce the appropriate output to indicate that a fire condition is present. The circuitry of apparatus 24 is used to produce a single output regardless of whether all three sensors simultaneously produce the electrical or electronic signal. The operation of the converter associated with this signal conditioner will be explained in greater detail with respect to an additional embodiment of the invention. A short circuit or a controlled overload device 26 is provided between the signal conditioner and converter 24 and the female outlet plugs 14 and 16. Communication between the short circuit device 26 and the female outlet plugs 14 and 16 is accomplished by standard gage wires 28 and 30, respectively. Communication between the signal conditioner and converter circuitry 24 and the short circuit or controlled overload device 26 is through conductor 25.

Figure 3:
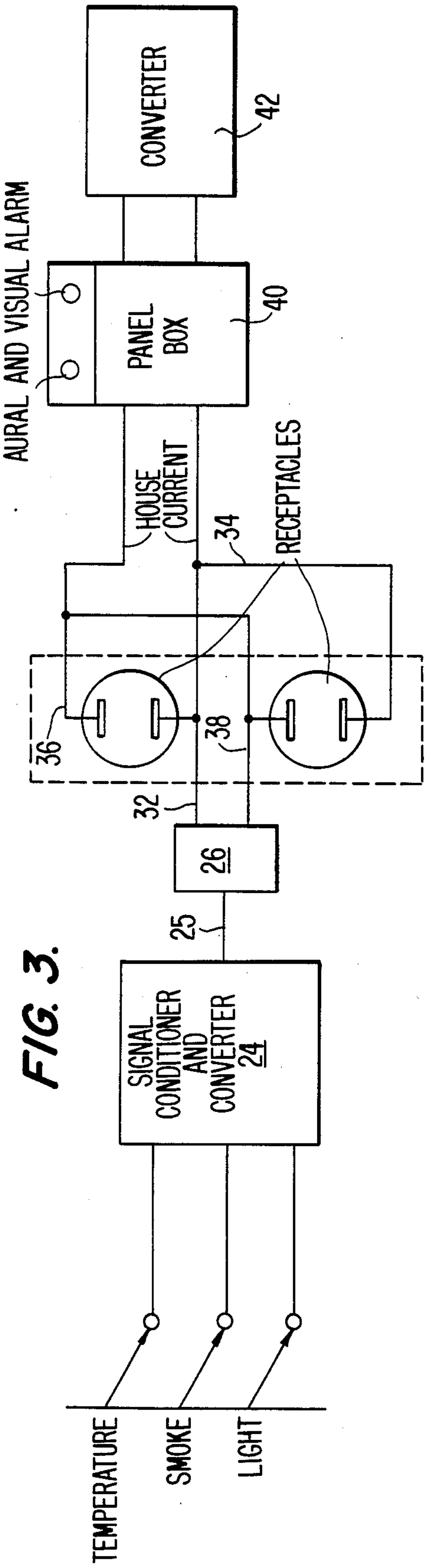
FIG. 3 is a block diagram showing the wiring of the present invention.

As shown in FIG. 3, each of the female outlet plugs is provided with a neutral wire 32 or 34 and a power wire 36 or 38. The short circuit or controlled overload device 26 is preferably connected to the neutral wires but could also utilize the power wires. When the short circuit device 26 is activated by any one of the sensors 18, 20 and 22, the correspondent circuit protective device, such as a circuit breaker provided in a circuit breaker panel box 40 senses the short circuit or an overload condition and trips, thereby providing an open circuit to the receptacle containing the particular short circuit or controlled overload device which has been activated. Additionally, a temperature sensor could be located in close contact with the lead wire within the circuit breaker which will react to a predetermined increase in the temperature of the wire, energizing an electromechanical trip mechanism which in turn will trip the breaker. This panel box is associated with an alarm system of the type recited in U.S. patent application Ser. No. 654,157, filed on Sept. 25, 1984 and shown in FIG. 4. Each of the circuit breakers contains a light-emitting diode which is activated when the breaker switch is tripped by an overload or a short circuit. The door of the circuit breaker is provided with a plurality of sensors corresponding to each of the light-emitting diodes. When one of the diodes is activated due to the tripping of a circuit breaker, the sensors provided on the door would, in turn, activate an aural or visual alarm. Alternatively, the aural or visual alarm could be directly activated by the tripping of one or more circuit breakers. Auxiliary alarm circuitry as well as a battery for energizing the alarm system are both provided on the frame of the circuit breaker panel box. Furthermore, the aural or visual alarm could also be tripped by the temperature sensor provided in close proximity to the circuit breaker, as mentioned previously.

Figure 4:
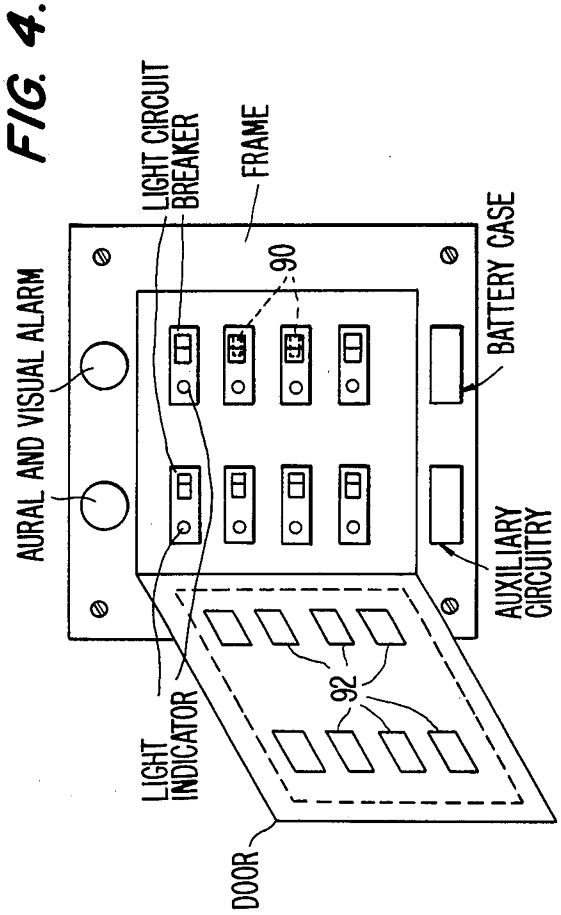
FIG. 4 is a front view of the electrical panel box having its door open and showing the location of the aural and visual alarms.

The aural or visual alarm shown in FIGS. 3 and 4 could also be activated by the sound or vibration created by the tripping of the breaker itself. In this situation appropriate sensors are placed within the panel box which are sensitive to the noise or vibration produced by the tripping of the breaker. Alternatively, as specifically shown in FIG. 4, the tripped condition can be sensed by locating a magnet 90 on, or embedding a magnet in the toggle of, the circuit breaker, or mounted internally on any moving part of the circuit breaker mechanism. A Hall effect device 92, located in proximity to the magnet, and located on the sheet metal cover of the panel or on the inside surface of the panel door, is used to sense the movement of the magnet, produced by the tripping of the circuit in response to an overload or short circuit, or the presence of a fire near one of the receptacles. The Hall effect device would activate a visual indicator such as an LED, liquid crystal electroluminescent device or any other type of light indicator. This light indicator would properly indicate which breaker has been tripped and concurrently activate an aural, light or any other type of alarm or combination thereof situated outside of the panel box.

In this first embodiment described hereinabove, the aural or visual alarms are activated based upon the tripping of one or more circuit breakers. These circuit breakers, in turn, were triggered by sensing a short circuit or controlled overload provided by the device 26 based upon information produced by any one of the sensors 18, 20 or 22.

In another embodiment, the electrical or electronic signal generated by the enabling of the temperature, smoke and light sensors 18, 20 and 22 is transmitted to the signal conditioner and converter 24 where it is converted to an encoded radio frequency (RF) signal. This encoded RF signal is transmitted to the alarm system shown in FIG. 4 via the power wire 38. The signal would then travel through the existing wiring in the electrical system, pass through the circuit breakers provided in the circuit breaker panel box 40 and then be converted back to an electrical or electronic signal by converter 42. This electrical or electronic signal is then conducted to activate the aural and visual alarms shown in FIG. 4. It should be noted that these aural and visual alarms need not be activated by sensing the tripping of a circuit breaker, but could be directly activated by the signal produced by the sensors 18, 20 and 22 and re-converted by the converter 42.

Figure 6:
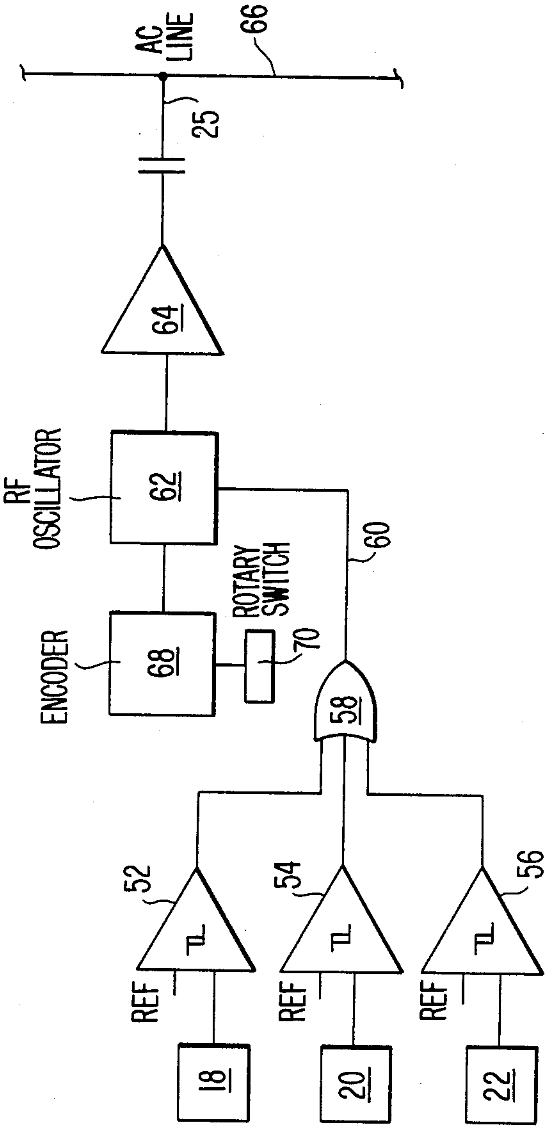
FIG. 6 is a block diagram showing the use of an encoded RF signal to trip the circuit breakers.

This embodiment is illustrated partly with respect to FIG. 6 and is construed to be part of the signal conditioner and converter circuit 24 shown in FIG. 1. The heat, light and smoke sensors 18, 20, 22 are connected to signal comparators 52, 54 and 56 respectively. When the sensor or sensors' status changes, and cross a threshold level as established by the reference, a signal is generated which is transmitted to an OR gate 58. An ENABLE signal along conductor 60 is produced if one or a combination of the sensors 18, 20 or 22 produces a signal greater than the threshold level set for each sensor. This signal activates an RF oscillator 62 which produces a carrier frequency which is frequency modulated, amplified by RF amplifier 64 and transmitted over the AC power line 66 to a receiver in proximity to the circuit breaker panel box. Since only the circuit breaker associated with the particular sensor which produced the original "alarm" signal indicating a fire condition near one of the receptacles should be tripped, an encoder 68 is employed for providing a unique signal for each of the breakers servicing one or more receptacles. The encoder is programmed by the user with a rotary-type switch 70 (see FIGS. 1 and 7) or any other switch which is suitable to produce unique encoded RF signals.

Figure 7:
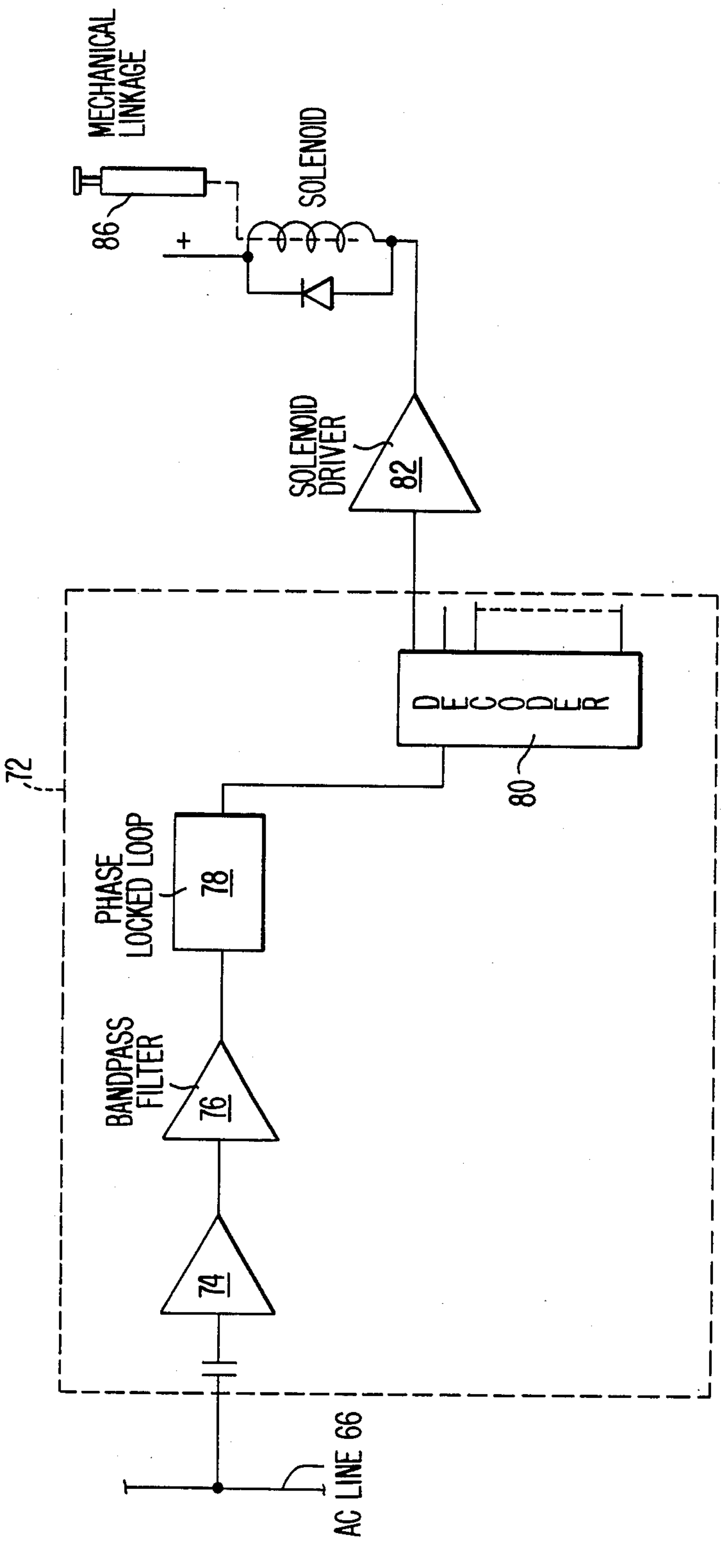
FIG. 7 is a block diagram of an RF receiver used in conjunction with the RF transmitted signal produced by the apparatus shown in FIG. 6.

The transmitted RF encoded signal produced by the apparatus shown in FIG. 6 is transmitted over the AC power line 66 and received by an RF receiver 72, illustrated in FIG. 7. The receiver 72 consists of an amplifier 74, a band pass filter 76, a phase locked loop 78, a decoder 80 and a solenoid driver 82. The amplifier 74 receives the RF signal and amplifies it to a suitable level to be processed by the receiver circuit 72. The band pass filter 76 reduces noise and interference induced by an AC power line 66 by transmitting only the necessary frequencies to the phase locked loop 78. This phase locked loop 78 is used as a frequency demodulator or discriminator, allowing the encoded signal to be conducted to the decoder 80 which includes a single output and a plurality of outputs, one output for each of the circuit breakers. Once the decoder 80 decodes the transmitted RF signal, a solenoid driver 82 is used to energize a solenoid 84 associated with a particular circuit breaker. Once the solenoid 84 is energized, the circuit breaker is tripped by a mechanical linkage 86 which is well known in the art and will not be described further. Although FIG. 7 shows only a single solenoid connected to the decoder, it should be noted that each circuit breaker is connected to the decoder through the use of a similar solenoid driver, solenoid and mechanical linkage assembly.

It should be noted that any type of signal encodation or modulation could be used to generate the particular RF signal. While the present invention contemplates the use of a tone modulation, pulse position modulation, pulse width modulation or any other type of modulation known to the industry could be employed.

Additionally, it should be noted that the encoded RF signal is transmitted via conductor 25 through the short circuit or controlled overload device 26 and to the AC power line 66 without the activation of the device 26. However, if the signals produced by any of the sensors 18, 20 and 22 are not converted into RF signals, then these signals will act to directly activate the short circuit or controlled overload device 26 which is directly sensed by the circuit breaker to provide an open circuit over that particular circuit line.

Figure 5:
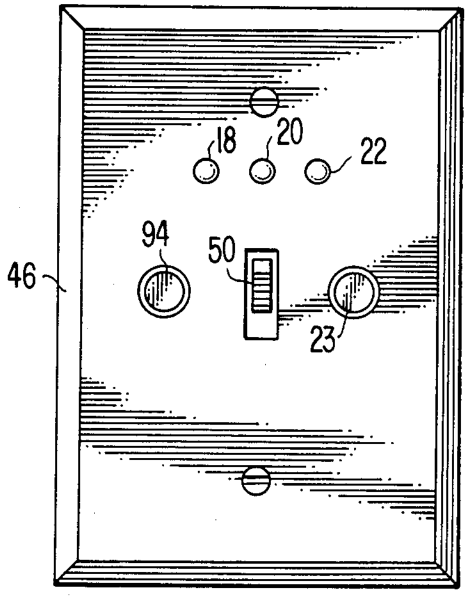
FIG. 5 is a front elevational view of a switchplate utilizing the sensors of the present invention.

The embodiment utilizing the encoded RF signal is beneficial when the fire detection device is being tested. In this situation, the circuit breakers need not be tripped for a determination of whether the particular sensing devices or circuits are operating properly. This test system can be activated by depressing a push-button switch or any other type of switching device and would be directly affixed to the wall receptacle of FIG. 1 or the wall switch shown in FIG. 5. FIG. 5 illustrates the invention utilized in such a wall switch 46 provided with a standard ON/OFF switch 50 which cooperates with an aperture provided on the planar surface of the wall switch 46. As ws true with the wall receptacle shown in FIG. 1, light, temperature and smoke sensors 18, 20 and 22, or any combination thereof, are directly affixed to the wall switch. A switch 23 is provided which activates the testing circuitry. Any switch, such as a standard ON/OFF switch, depressing switch, or toggle switch or the like could be utilized for this purpose. This test switch would allow the encoded RF signal produced by the signal conditioner and converter circuit 24 to conduct this signal through power wire 38 to the receiver 72.

The system of the present invention can be utilized to monitor the protected area for emergency situations other than just fire. For example, an additional button 94 can be added to the wall receptacle 10 shown in FIG. 1 on the light switch 46. This button is manually depressed when any emergency situation is sensed by any of the occupants of the protected area. A particular RF encoded signal is produced and in the manner described with respect to FIG. 6, this signal is transmitted along the existing electrical wiring until it reaches the alarm box provided with a display board. However, it should be noted that the particular signal generated does not result in the tripping of any of the circuit breakers, but would be used to activate a visual indication of the location of the particular protected area in which the emergency is located. An aural alarm could also be activated to alert a guard to the presence of an emergency condition, at which time the proper personal are dispatched to the emergency location.

Figure 8:
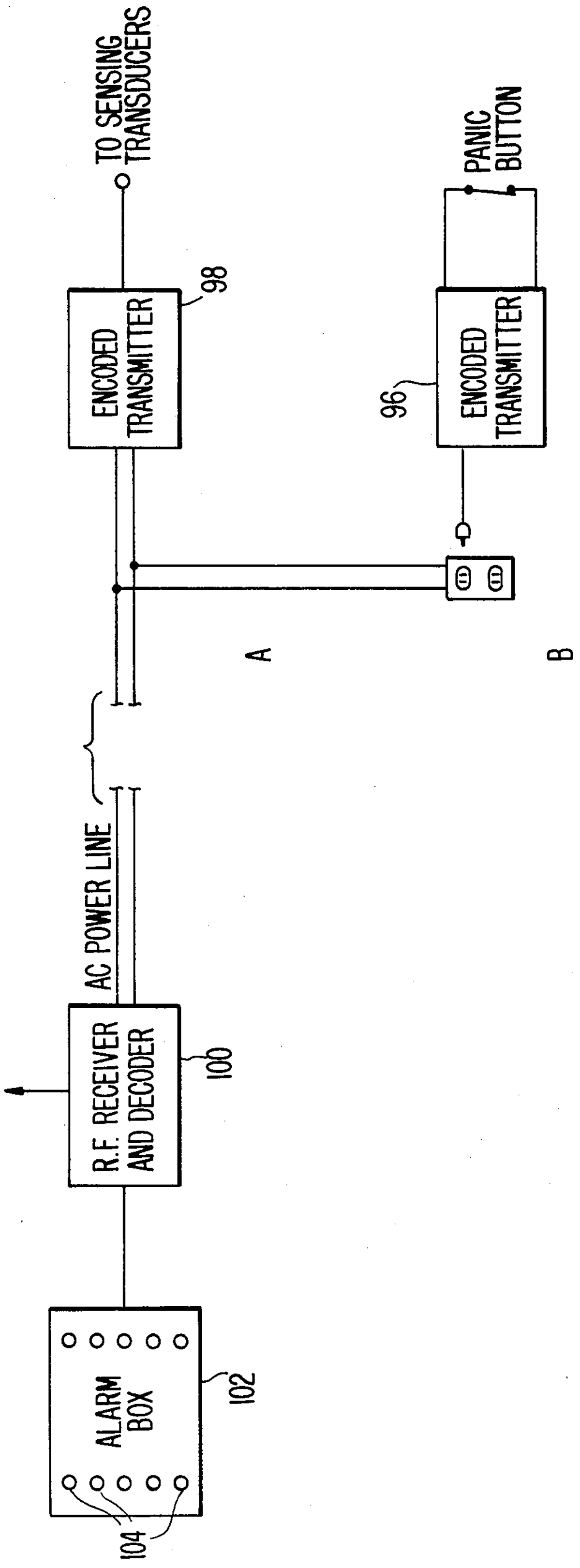
FIG. 8 is a block diagram showing an additional embodiment of the present invention.

FIG. 8 illustrates an alternative embodiment of the present in which various portable security transmitters 96 are included in a system with permanently affixed transmitter 98. Each transmitter 96 is provided with a panic button which is manually activated and produces a particular RF signal. This signal is transmitted over the AC power line to an RF receiver and decoder 100 which decodes the RF signal. This signal is then transmitted to an alarm box 102 having visual indicators 104 provided for each of the protected areas. Therefore, the activation of one of the panic or emergency buttons would result in the activation of the appropriate visual indicator 104.

Furthermore, the present system can easily be employed to monitor the protected area for intruders. State-of-the-art sensing devices for sensing an unauthorized presence or entry can be directed wired into the system and the activation of such a device would be displayed on alarm box 102.

Obviously, many modifications and variations of the present invention are possible in light of the above teachings. For example, fuses or similar devices could be substituted for the circuit breakers, particularly in the second embodiment which utilizes the encoded RF signal. This is true because the aural and visual alarms are not activated by the circuit breaker being tripped as is true with respect to the first embodiment which activates these alarms due to the sensing of a short circuit or controlled overload, but rather, these alarms are activated by the RF signals themselves. Consequently, any type of circuit protection device could be utilized in this embodiment. Additionally, various ultrasonic, photoelectric, infrared, mechanical and magnetic transducers can be used to produce the appropriate signals. Therefore, it is to be understood that within the scope of the appended claims, the invention may be practiced otherwise than as specifically described.

What is claimed is:

1. An alarm system utilizing the existing electrical wiring provided in the structure and wall mounted electrical receptacles and wall-mounted switchplates connected to said wiring, each of said wall-mounted electrical receptacles and switchplates provided in a protective area, comprising:

at least one alarm signal generating means connected to said receptacles or switchplates for producing an alarm signal;

a plurality of first conversion means connected between said alarm signal generating means and said electrical wiring for converting the signal produced by said alarm signal generating means to an encoded RF signal and conducting said signal over said existing electrical wiring, each of said first conversion means provided with an encoder for producing an encoded signal different than the signal produced by at least one other first conversion means;

second conversion means connected to each of said first conversion means by said electrical wiring for converting the respective encoded RF signal produced by each of said first conversion means and transmitted over the existing wiring to said second conversion means to an electrical or electronic signal;

a panel box provided with a plurality of circuit protective devices therein, said panel box connected to said electrical wiring downstream from each of said first conversion means; and a central monitor provided at a location remote from said panel box for displaying the location of each of said alarm signal generating means, said central monitor visually displaying the location of each of said produced alarm signal based upon the signals generated by said conversion means.

2. The alarm system in accordance with claim 1 wherein said panel box is provided between said plurality of first conversion means and said second conversion means.

3. The alarm system in accordance with claim 1 wherein said panel box is provided between said second conversion means and said central monitor.

4. The alarm system in accordance with claim 1 wherein said wall-mounted electrical receptacles and switchplates and further provided with at least one sensing means directly affixed thereto for sensing the presence of a fire condition in the environment in proximity to said receptacles and switchplates, said sensor providing a signal which is connected to one of said first conversion means which would ultimately trip said circuit protective device associated with said respective receptacle and switchplate.

5. The alarm system in accordance with claim 1 wherein said alarm signal generating means is manually activated.

6. The alarm system in accordance with claim 1 wherein said alarm signal generating means is automatically activated.

7. The alarm system in accordance with claim 1 wherein said alarm signal generating means is directly affixed to said receptacles.

8. The alarm system in accordance with claim 1 wherein said alarm signal generating means is removably connected to said receptacles.

* * * * *